United States Patent
Tamarindo

(10) Patent No.: US 12,179,984 B2
(45) Date of Patent: Dec. 31, 2024

(54) SPOUT FOR FLEXIBLE THIN-WALLED PACKAGINGS

(71) Applicant: Guala Pack S.P.A., Alessandria (IT)

(72) Inventor: Stefano Tamarindo, Alessandria (IT)

(73) Assignee: Guala Pack S.P.A., Alessandria (IT)

( * ) Notice: Subject to any disclaimer, the term of this patent is extended or adjusted under 35 U.S.C. 154(b) by 161 days.

(21) Appl. No.: 17/979,504

(22) Filed: Nov. 2, 2022

(65) Prior Publication Data
US 2023/0150745 A1    May 18, 2023

Related U.S. Application Data

(62) Division of application No. 17/609,186, filed as application No. PCT/IB2020/054309 on May 7, 2020, now abandoned.

(30) Foreign Application Priority Data

May 9, 2019   (IT) .................. 102019000006687

(51) Int. Cl.
*B65D 75/58*    (2006.01)
*B29C 45/26*    (2006.01)
*B29C 45/00*    (2006.01)

(52) U.S. Cl.
CPC ...... *B65D 75/5883* (2013.01); *B29C 45/2612* (2013.01); *B29C 45/0025* (2013.01); *B29C 2045/0034* (2013.01)

(58) Field of Classification Search
CPC ............ B65D 75/5872; B65D 75/5883; B29C 45/261; B29C 45/2612; B29C 45/2616
See application file for complete search history.

(56) References Cited

U.S. PATENT DOCUMENTS

| 6,474,490 | B1 | 11/2002 | Seibel et al. |
| 7,762,414 | B2 | 7/2010 | Uytterhaeghe et al. |
| 2009/0008416 | A1* | 1/2009 | Kurosawa .......... B65D 75/5883 425/577 |

(Continued)

FOREIGN PATENT DOCUMENTS

| DE | 102007011929 A1 | 9/2008 |
| EP | 1538105 A1 | 6/2005 |

(Continued)

OTHER PUBLICATIONS

Third Party Observations filed against EP Application No. 20728553.7 (11 pages).

(Continued)

*Primary Examiner* — S. Behrooz Ghorishi
*Assistant Examiner* — Alexander A Wang
(74) *Attorney, Agent, or Firm* — Polsinelli PC

(57) ABSTRACT

A thin-walled flexible package is provided with a spout comprising a connection portion and a tube having an outer surface and ending with an outlet mouth. A sacrificial closure is applied to the spout to close the outlet mouth. The sacrificial closure comprises a skirt suitable for sealingly engaging the outer surface of the tube at a sealing region having a sealing distance from the outlet mouth. On the outer surface of the tube there is a circumferential dividing line having a division distance from the outlet mouth. The sealing distance is less than the division distance.

4 Claims, 5 Drawing Sheets

(56) References Cited

U.S. PATENT DOCUMENTS

| | | | |
|---|---|---|---|
| 2017/0001743 A1 | 1/2017 | Tamarindo |
| 2017/0107008 A1 | 4/2017 | Ichikawa |
| 2017/0283105 A1 | 10/2017 | Tamarindo |
| 2018/0346219 A1 | 12/2018 | Murray et al. |
| 2020/0087039 A1 | 3/2020 | Berge |

FOREIGN PATENT DOCUMENTS

| | | |
|---|---|---|
| EP | 1980498 A1 | 10/2008 |
| JP | 201122225 A | 5/2001 |
| JP | 2003237742 A | 8/2003 |
| WO | 2008038054 A1 | 4/2008 |
| WO | 2012055459 A1 | 5/2012 |
| WO | 2017001947 A1 | 1/2017 |
| WO | 2017168322 A1 | 10/2017 |

OTHER PUBLICATIONS

International Search Report and Written Opinion for corresponding International Application No. PCT/IB2020/054309 dated Feb. 15, 2021 (10 pages).

Notification of Transmittal of the International Preliminary Report on Patentability dated Jun. 24, 2021 for the corresponding International Application No. PCT/IB2020/054309 (7 pages).

\* cited by examiner

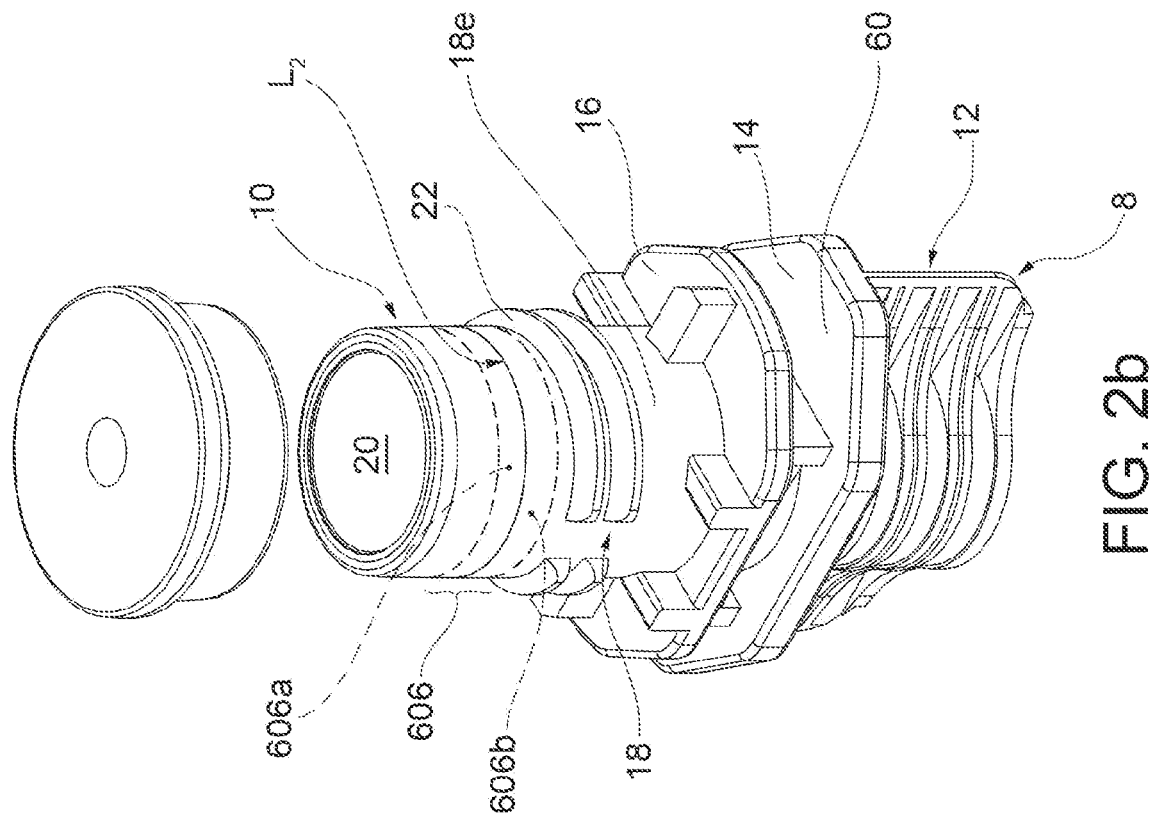
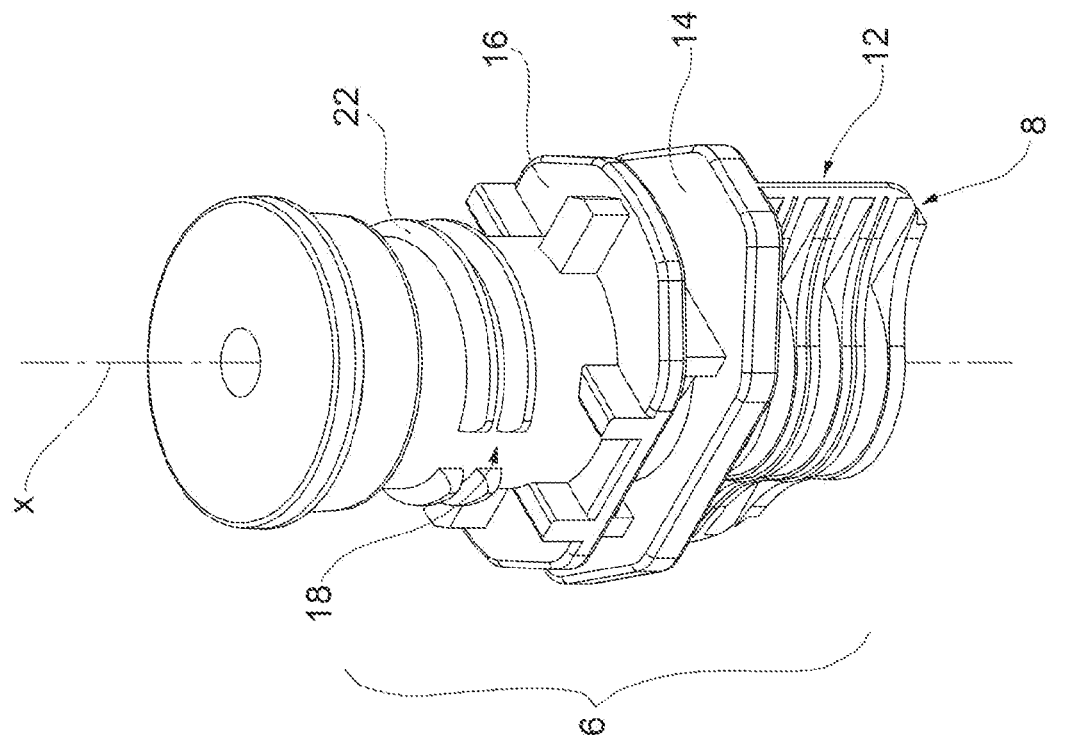

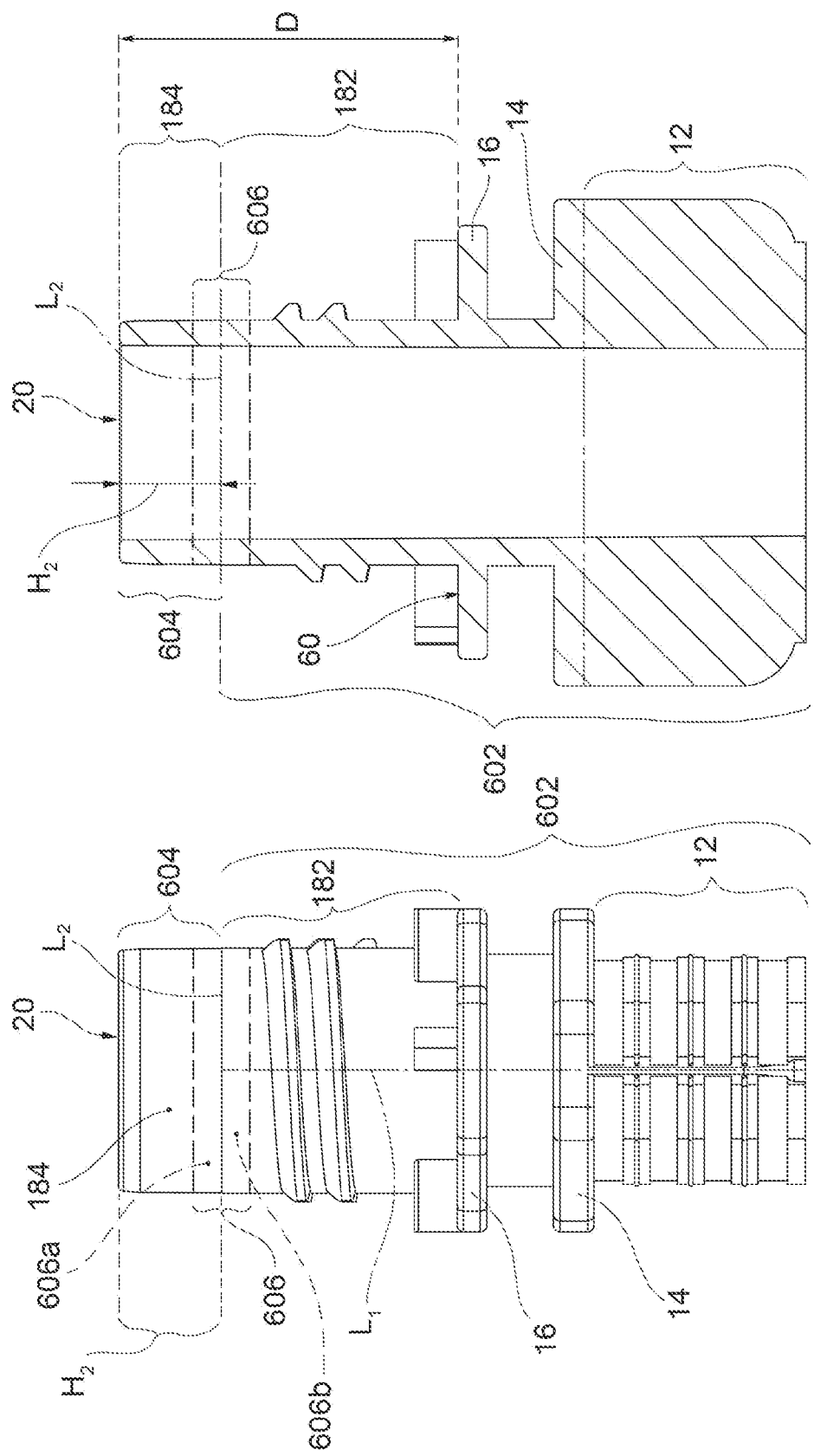

SPOUT FOR FLEXIBLE THIN-WALLED PACKAGINGS

CROSS-REFERENCE TO RELATED PATENT APPLICATIONS

This patent application is a divisional application of U.S. patent application Ser. No. 17/609,186, entitled "SPOUT FOR FLEXIBLE THIN-WALLED PACKAGINGS," filed on Nov. 5, 2021, which is a national stage entry of PCT Application No. PCT/IB2020/054309, entitled "SPOUT FOR FLEXIBLE THIN-WALLED PACKAGINGS," filed May 7, 2020, which claims priority of IT 102019000006687, filed on May 9, 2019, each of which is incorporated herein by reference in its entirety.

DESCRIPTION

The present invention relates to the field of flexible thin-walled packagings, in jargon called "pouches," typically provided with a spout provided with a cap. Such packagings are widely used to contain products such as fruit juices, fruit or vegetable puree, yogurt, drinks, creams, honey, mostly intended for consumption by children.

The sterilization of these packagings has enormous importance for the prevention of infections and the correct preservation of the product contained therein.

Sometimes, chemical sterilization is carried out, during which the packaging is washed with disinfectant agents, for example hydrogen peroxide, and then dried, before being sent to subsequent filling operations. However, chemical sterilization has some drawbacks such as, for example, the presence of residues of the disinfectant agent in the dry container or the presence of non-disinfected areas due to complex or irregular geometries of the packaging. This drawback is particularly felt in the pouch sector.

A significant diffusion in the sector, on the other hand, is sterilization by ionizing radiation, such as gamma rays or electron beams. For example, the Applicant is the owner of the International Applications WO-A1-2012/147007 and WO-A1-2012/147008.

Usually, the sterilization by ionizing radiation is carried out in specialized centers, to which the packaging manufacturer sends the packagings to be treated; after sterilization, the sterile packages are sent to the person who carries out the filling and the application of the closure, using measures that allow the maintenance of the sterility condition inside the packaging. Such logistics obviously imply considerable transport costs between the sites and a considerable complexity of managing the packagings within the sites themselves.

To overcome this drawback, the Applicant has already devised a system for managing the sterilization of flexible thin-walled packagings in which the use of a plurality of sacrificial closures applied to the spout outlet mouth before sterilization is provided, subsequently separated from the spout in a sterile chamber, just before filling the packaging. This system is illustrated in International Applications WO-A1-2017/001947 and WO-A1-2017/168322.

As may be understood, in order for this system to be fully effective, the application of the sacrificial closure to the spout outlet mouth should ensure air tightness, in order to prevent the interior of the packaging from being contaminated before filling it in the sterile chamber.

The object of the present invention is to provide a spout for a flexible thin-walled packaging which is particularly effective for the application of a sacrificial closure.

Such an object is achieved by a spout including a thin-walled flexible package provided with a spout comprising a connection portion and a tube having an outer surface and ending with an outlet mouth, a sacrificial closure applied to the spout to close the outlet mouth, wherein the sacrificial closure comprises a skirt suitable for sealingly engaging the outer surface of the tube at a sealing region having a sealing distance from the outlet mouth, wherein on the outer surface of the tube there is a circumferential dividing line having a division distance from the outlet mouth, the dividing line being contained in an annular band of the outer surface, the band being free of projections and divided by the band into an upper band, towards the outlet mouth, and a lower band, on the opposite side; and wherein the sealing distance is less than the division distance; wherein the dividing line divides the tube into a lower portion and an end portion provided with the outlet mouth, wherein the skirt engages the end portion; wherein the spout comprises a thread, protruding from the outer surface of the tube, entirely contained in the lower portion. The dependent claims describe further advantageous embodiments of the invention, wherein the skirt of the sacrificial closure comprises a lip seal, protruding radially internally, operating on the outer surface of the tube in the sealing region, wherein the sacrificial closure is reversibly applicable to the spout, wherein the sacrificial closure is irreversibly applicable to the spout.

The features and the advantages of present invention will appear more clearly from the following description, made by way of an indicative and non-limiting example with reference to the accompanying figures, in which:

FIG. 2a shows a spout according to an embodiment of the present invention, with sacrificial closure applied;

FIG. 2b shows the spout of FIG. 2a, with separate sacrificial closure;

FIG. 3 shows a cross-sectional view of the spout of FIG. 2a;

FIG. 5a shows the spout according to the present invention, according to a side view;

FIG. 5b shows the spout of FIG. 5a, according to a cross-sectional view; and

Figure 1:
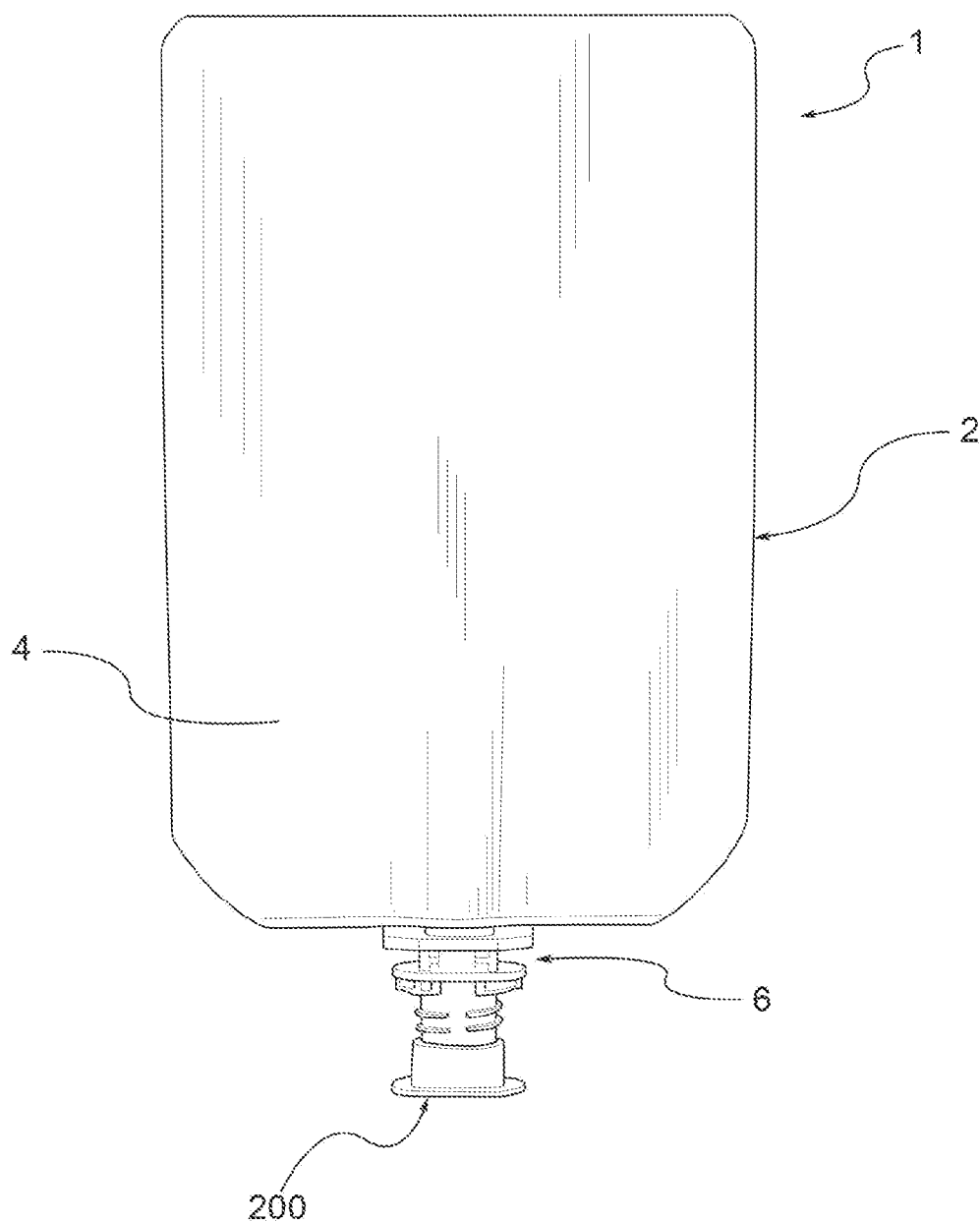
FIG. 1 shows an assembly comprising a flexible packaging and a sacrificial closure, according to an embodiment of the present invention.
Figure 4:
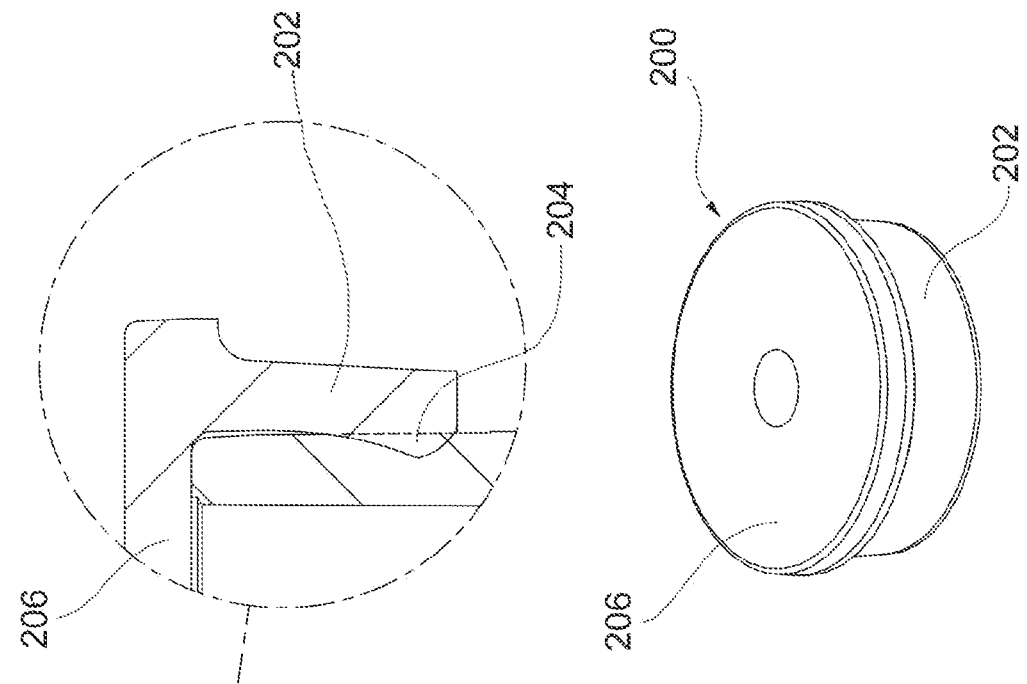
FIG. 4 shows a sacrificial closure, according to an embodiment of the present invention.
Figure 3:
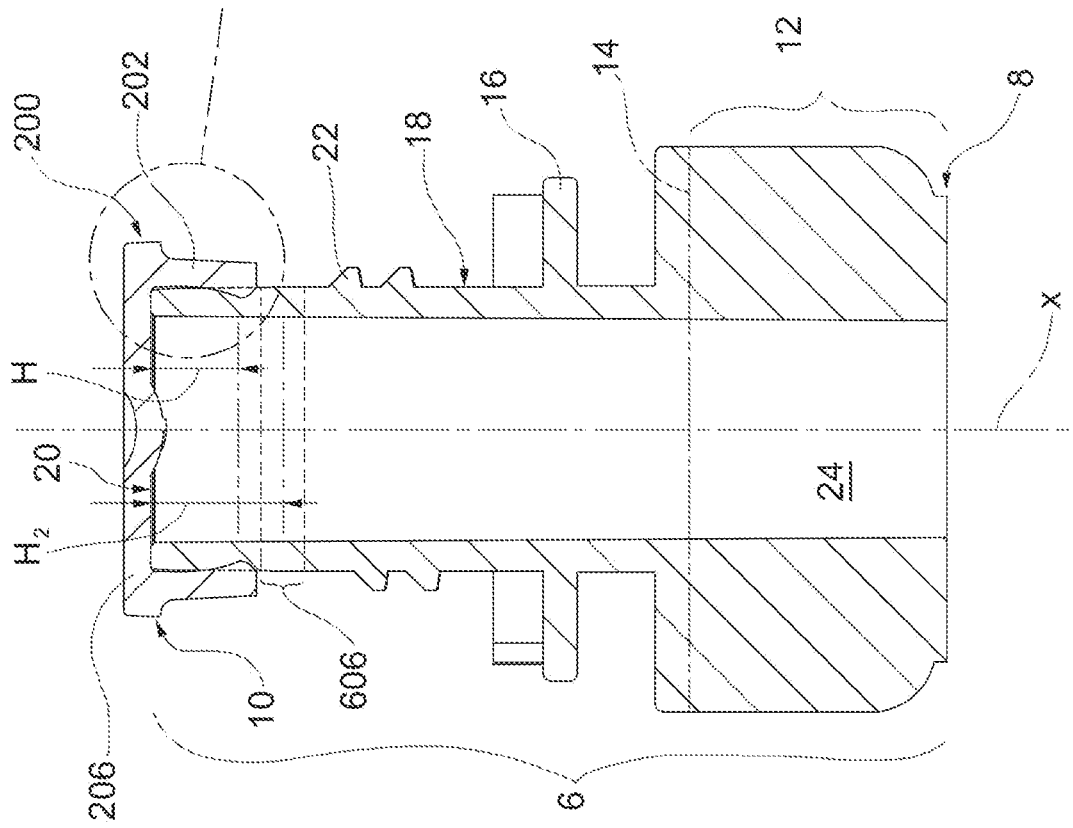

With reference to the accompanying drawings, reference numeral 1 indicates a flexible thin-walled packaging, comprising a packaging body 2, comprising thin walls 4 facing each other, and a spout 6, sealingly fixed, preferably by welding, between the thin walls 4 of the packaging body 2.

The packaging 1 is provided with a sacrificial closure 200 applied to the outlet mouth of the spout 6.

According to a first embodiment, the sacrificial closure 200 is applied reversibly to the spout 6, that is, so that it may be separated from the spout to have access to the outlet mouth; for example, the sacrificial closure is a cap applied by pressure to the spout and separable from it.

According to a further embodiment, the sacrificial closure 200 is irreversibly applied to the spout, i.e. in such a way that it must be at least partially torn to allow access to the outlet mouth; for example, the sacrificial closure is a cap applied by pressure to the spout so as not to be removable and comprises a tear-resistant membrane.

According to the sterilization process, a packaging 1 is produced on a production site.

Subsequently, the sacrificial closure 200 is applied to the empty packaging 1, preferably at the production site.

The empty packaging—sacrificial closure assembly, for example after being transported from the production site to a sterilization site—undergoes a sterilization process, typically by ionization by gamma or beta rays, obtaining a sterilized assembly.

According to an alternative embodiment, the sacrificial closure 200 is applied to the spout 6 at the sterilization site, however, before carrying out the sterilization process.

The sterilized assembly, preferably after being transported to a filling site, is sent to a filling machine, where at least part of the spout 6 passes through a sterile chamber.

In the sterile chamber, the sacrificial closure 200 is tampered with so as to access the outlet mouth of the spout 6.

The packaging 1 is then filled through the outlet mouth of the spout.

If the sacrificial closure 200 is irreversibly applied to the spout 6, the sacrificial closure 200 is at least partially torn, for example by breaking a surface membrane; the packaging 1 is then filled through the outlet mouth of the spout.

Subsequently, according to an embodiment of the invention, while the full packaging is still in the sterile chamber, a definitive closure, for example a cap with a thread, is applied to the spout 6; in this way a filled packaging-final closure assembly for marketing is obtained.

According to an alternative embodiment, while the full packaging is still in the sterile chamber, a temporary closure is applied to the spout, for example consisting of the sacrificial closure; a filled packaging-temporary closure assembly is thus obtained, to which the definitive closure is subsequently applied outside the sterile chamber. According to such embodiment variant, the definitive closure is suitable for engaging with the temporary closure, so that, once the definitive closure has been removed, the temporary closure is also removed from the spout.

The spout 6 extends mainly along a main axis X, between a lower end 8 and an upper end 10.

At the lower end 8, the spout 6 comprises a connecting portion 12, usually defined as a "welding boat", intended for welding between the thin walls 4 of the packaging body 2.

Preferably, the spout 6 further comprises a lower plate 14, which extends on an imaginary plane orthogonal to the main axis X, adjacent to the connecting portion 12, and an upper plate 16, parallel to and separated from the lower plate 14.

The spout 6 further comprises a tube 18, provided with an outer surface 18e, which protrudes from the upper plate 16 and extends to the upper end 10, where there is an outlet mouth 20.

On the outside of the tube 18 a thread 22 is preferably provided for screwing the final closure.

Internally, the spout 6 has a through dispensing duct 24 which extends from the outlet mouth 20 to the lower end 8, having a central axis coinciding with the main axis X of the spout 6.

The sacrificial closure 200 comprises a skirt 202 consisting of an annular wall having a predefined axial height, provided with an inner diameter such as to allow the skirt to be fitted on the outer surface of the tube 18.

Preferably, the skirt 202 comprises a seal 204 consisting of a lip protruding radially internally, suitable for achieving an airtight seal by adhering to the outer surface of the tube 18.

Furthermore, the sacrificial closure 200 comprises a base 206 which closes the skirt 202 at the top; in the embodiment in which the sacrificial closure is irreversible, the base 206 is a tearable membrane.

The spout 6 is made of a single piece of plastics material, preferably by injection molding.

In particular (FIGS. 5a and 5b), the spout 6 consists of two portions: a first portion 602, comprising the connecting portion 12, eventually the lower plate 14 and the upper plate 16, and a lower portion 182 of the tube 18, and a second portion 604 comprising an end portion 184 of the tube 18, provided with the outlet mouth 20.

Figure 6:
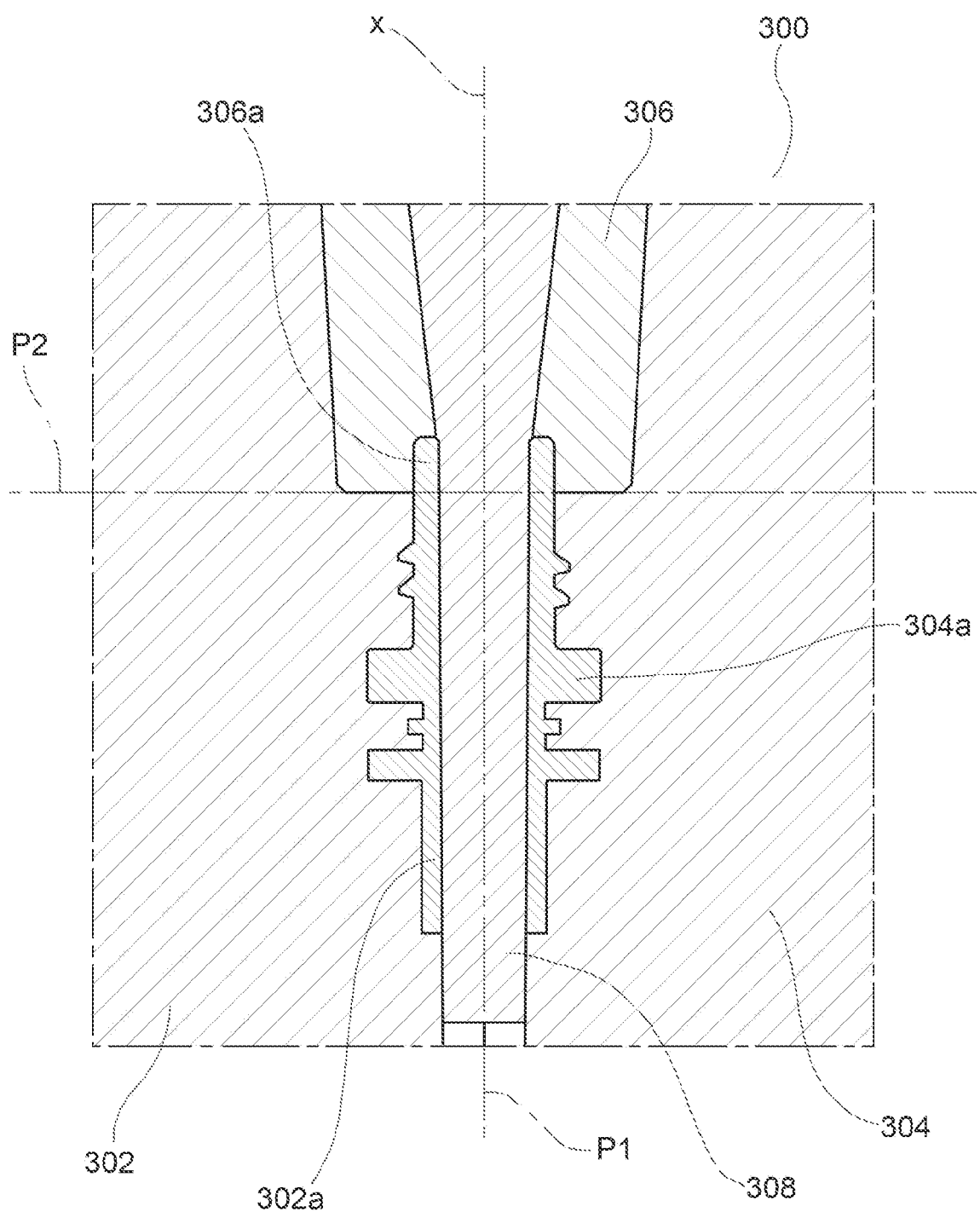
FIG. 6 shows a diagram of a mold for making the spout according to an embodiment of the present invention.

The spout 6 is obtained in a single piece by injection molding, using for example a mold assembly 300 (FIG. 6).

The mold assembly 300 comprises a first half-mold 302 having a first half-cavity 302a and a second half-mold 304 having a second half-cavity 304a. The two half-molds 302, 304 come into contact with each other on a first contact plane P1, so that the two half-cavities 302a, 304a form a first cavity.

The first portion 602 of the spout is obtained by filling the first cavity. At the first contact plane P1, on the first portion 602 of the spout 6 it is possible to see a first dividing line L1.

Preferably, the first dividing line L1 is contained on an imaginary plane which also contains the main axis X.

The mold assembly 300 further comprises an annular insert 306, having a second cavity 306a which has complete annular extension; the insert 306 couples with the two half-molds 302, 304 so that the second cavity 306a is arranged astride the two half-molds 302, 304 and is joined to the first cavity.

The second portion 604 is obtained by filling the second cavity 306a.

At the connection between the first portion 602 and the second portion 604, a second circumferential dividing line L2 may be seen, having a predefined distance H2 from the outlet mouth 20.

The second dividing line L2 lies on an imaginary plane P2 orthogonal to the main axis X.

Furthermore, between the first portion 602 and the second portion 604, on the outer surface 18e of the tube 18, a smooth annular band 606 is defined, free of any flanges, projections, protrusions and the like.

The second dividing line L2 is contained in the band 606, dividing it into an upper band 606a, towards the outlet mouth 20, and a lower band 606b, on the opposite side.

Finally, the mold assembly 300 comprises a male element 308 which crosses the insert 306 and passes through the second cavity 306a and through the first cavity, so as to create the inner cavity of the spout.

The skirt 202 of the sacrificial closure 200 cooperates with the outer surface 18e of the tube 18 to seal the inlet mouth, along a sealing region having an axial distance H from the outlet mouth 20, wherein the sealing distance H is less than or equal to the division distance H2 between the second dividing line L2 and the outlet mouth 20.

In other words, the sacrificial closure 200 engages the tube 18 only at the second portion 604, i.e. only on the outer surface of the end portion 184 of the tube 18.

In particular, the seal 204 of the skirt 200 operates on the outer surface of the end portion 184 of the tube 18 at a sealing distance H from the outlet mouth 20, wherein the sealing distance H is less than the division distance H2 of the second dividing line L2 from the outlet mouth 20.

This allows the sealing between the skirt 202 and the outer surface 18e of the tube 18 to be achieved on a smooth surface, without dividing lines which could compromise the sealing itself, to the advantage of maintaining the seal.

Preferably, moreover, the thread 22 is made on the lower portion 182 of the tube 18.

Innovatively, this allows an excellent seal to be obtained between the sacrificial closure and the spout tube, and to preserve it for the subsequent steps of the production process.

It is clear that a man skilled in the art may make changes to the invention described above in order to meet incidental needs, all falling within the scope of protection defined in the following claims.

The invention claimed is:

1. A method of manufacturing a closure assembly comprising a spout and a sacrificial closure, the method comprising:
    making the spout through following sub-steps:
    providing a mold provided with a first half-cavity and a counter-mold provided with a second half-cavity;
    joining the first half-cavity and the second half-cavity and thus obtaining a first cavity corresponding to a first portion of the spout, said first portion comprising a connecting portion and a lower portion of a tube;
    providing an insert suitable for cooperating with the mold and the counter-mold to obtain a second cavity, corresponding to an annular wall for making a second portion of the spout, said second portion corresponding to an end portion of the tube, adjacent to the lower portion, having an outlet mouth, said end portion having an axial length equal to a division distance;
    making the sacrificial closure provided with a skirt provided with a lip seal, protruding radially internally from the skirt, suitable for operating on an outer surface of the tube;
    applying the sacrificial closure to the tube to close the outlet mouth, so that the lip seal engages the outer surface in a sealing region having a sealing distance from the outlet mouth, wherein the sealing distance is less than the division distance,
    wherein the end portion of the tube extends up to a circumferential dividing line corresponding to a connection between the first portion and the second portion of the spout, wherein the first cavity further corresponds to a smooth annular band defined between the first portion and the second portion of the spout and free of any flanges, projections, protrusions on the outer surface of the tube, wherein the circumferential dividing line is contained in the smooth annular band,
    wherein the circumferential dividing line lies on an imaginary plane orthogonal to a main axis of the spout, wherein the imaginary plane corresponds to coupling of the insert with the mold having the first half-cavity and the counter-mold having the second half-cavity.

2. The method of manufacturing a closure assembly according to claim 1, wherein the first cavity further corresponds to an upper plate of the first portion of the spout, the upper plate having an upper plate surface from which the outer surface of the tube protrudes, wherein said upper plate surface has a main distance from the outlet mouth, wherein the sacrificial closure is applied to the tube so that the sealing region is equal or less than 30% of the main distance.

3. The method of manufacturing a closure assembly according to claim 1, wherein the first cavity further corresponds to a thread of the tube for screwing a final closure to the spout, wherein the thread is provided on the lower portion of the tube and outside the smooth annular band.

4. The method of manufacturing a closure assembly according to claim 3, wherein the circumferential dividing line divides the smooth annular band into an upper band, towards the outlet mouth, and a lower band, on an opposite side, wherein the thread is provided below the lower band along the main axis of the spout.

* * * * *